United States Patent [19]

Krupa

[11] 3,790,824

[45] Feb. 5, 1974

[54] RADIO FREQUENCY SWITCHING CIRCUIT

[75] Inventor: John E. Krupa, Moorestown, N.J.

[73] Assignee: The United States of America as represented by the Secretary of the Navy, Washington, D.C.

[22] Filed: Oct. 10, 1972

[21] Appl. No.: 296,456

[52] U.S. Cl. .................. 307/256, 307/241, 307/259

[51] Int. Cl. .................. H03k 17/00

[58] Field of Search ........... 307/243, 256, 241, 259; 332/43 B, 47; 329/204

[56] References Cited

UNITED STATES PATENTS

| | | | |
|---|---|---|---|
| 2,898,462 | 8/1959 | Karlson | 307/243 X |
| 3,158,692 | 11/1964 | Gerkensmeier | 307/243 X |
| 2,773,181 | 12/1956 | Singel | 329/204 X |

*Primary Examiner*—Rudolph V. Rolinec
*Assistant Examiner*—B. P. Davis
*Attorney, Agent, or Firm*—R. S. Sciascia; Henry Hansen

[57] ABSTRACT

A high speed switching circuit wherein the polarity of a control pulse determines which of two discrete RF signals is applied to an output terminal. Each RF signal is coupled through input and output transformer circuits to a common output terminal. A pair of diodes connected between the input and output transformers of one circuit are oppositely biased from similarly connected diodes in the other circuit. The control pulse is fed to a center tap of the secondary of each input transformer. Capacitive shunts are connected between each pair of diodes. Thus a simple switch is obtained having low power requirements, high speed and improved isolation.

4 Claims, 1 Drawing Figure

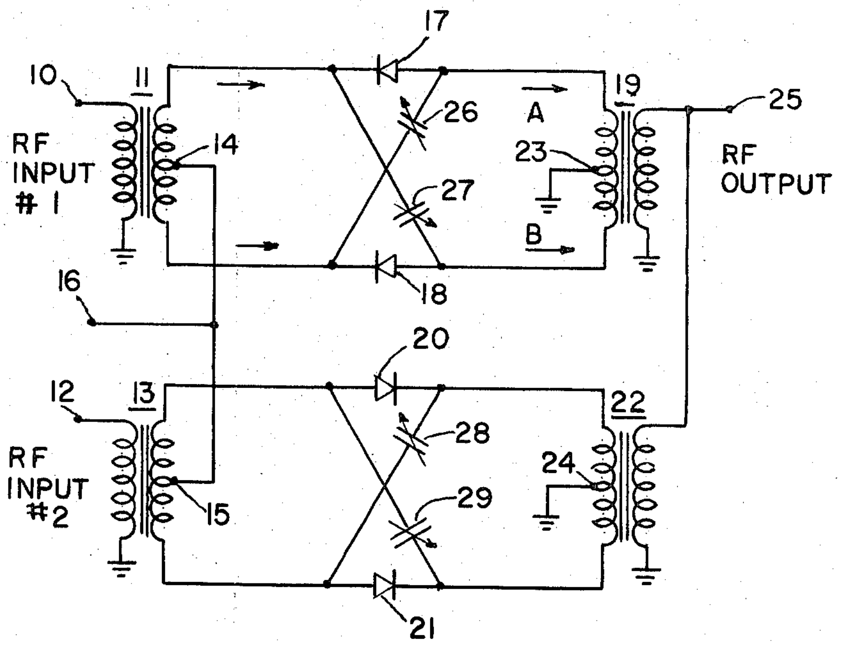
10
11
RF
INPUT
1
14
17
26
27
18
A
B
19
23
25
RF
OUTPUT
16
12
13
RF
INPUT
#2
15
20
28
29
21
22
24

RADIO FREQUENCY SWITCHING CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a solid state switch for selectively passing one of two discrete RF signals. Such switches in the prior art generally include diode bridges and blocking diodes coupled to RF input transformers. High control currents are necessary for switching and switching time is frequently too long in modern and more advanced systems and applications.

SUMMARY OF THE INVENTION

Accordingly it is a general purpose and object of the present invention to provide an improved, simplified solid state switching circuit for selectively switching between two discrete RF signals while maintaining capacitive isolation thereof. It is a further object to provide a switching circuit having low power consumption and high speed switching capability. It is yet another object to provide a switching circuit having virtually no switching transient at the output terminal.

Briefly these and other objects are accomplished according to the invention by a pair of input transformers connected at the center taps of their secondary coils to receive a positive or negative control pulse. The secondary coils are connected through respective pairs of forward- and reversed-biased diodes to output transformers, the secondary coils of which are connected to a common RF output terminal. In addition, a pair of variable capacitors are connected between each pair of diodes to cancel the residual capacitive effect thereof.

BRIEF DESCRIPTION OF THE DRAWING

The FIGURE is a circuit diagram of a switch constructed according to the invention.

DESCRIPTION OF THE PREFERRED EMBODIMENT

Referring now to the drawing a switching circuit according to the invention includes a first RF signal applied to a terminal 10 of the primary of a transformer 11, and a second RF signal, discrete from the first, applied to a terminal 12 of the primary of a transformer 13. The other ends of both primaries are grounded. Center taps 14 and 15 of the secondaries of transformers 11 and 13 are connected in common to a control pulse input terminal 16. Blocking diodes 17 and 18 are connected at their cathodes to respective ends of the secondary of transformer 11 and at their anodes to respective ends of the primary of an output transformer 19. Blocking diodes 20 and 21 are connected at their anodes to respective ends of the secondary of transformer 13 and at their cathodes to respective ends of the primary of an output transformer 22. The primaries of transformers 19 and 22 are grounded at their center taps 23 and 24. One end of the secondaries of transformers 19 and 22 are connected in common to an RF output terminal 25. The other ends of the secondaries of transformers 19 and 22 are grounded. A negative control pulse applied at input terminal 16 flows as shown by the arrows in the drawing. Diodes 20 and 21 are reverse-biased blocking the flow of current therethrough and preventing the second RF input signal at terminal 12 from passing to terminal 25. Diodes 17 and 18 are forward-biased connecting the first RF input signal at terminal 10 to terminal 25. Similarly, reversing the polarity of the control pulse now blocks the first RF signal and passes the second.

This switching circuit has virtually no switching transient signal at terminal 25 because the control current at terminal 16 divides equally between upper and lower windings of output transformers 19 or 22, as shown by arrows A and B, completely canceling each other.

In order to eliminate any portion of the blocked RF signals from being transmitted due to residual capacitive effects in reverse-biased diodes 17 and 18, or 20 and 21, depending on control pulse polarity, four variable shunt capacitors 26, 27, 28 and 29 are included. Capacitor 26 is connected from the cathode of diode 18 to the anode of diode 17, and capacitor 27 is connected from the cathode of diode 17 to the anode of diode 18. Capacitors 28 and 29 are similarly connected to diodes 20 and 21. Any signal A which is due to residual diode capacitance from diode 17 is canceled by applying signal B of equal strength through capacitor 27. This technique is used to balance each diode so that the first or second RF input signal, depending on pulse control current polarity, is completely inolated from output terminal 25.

Some of the many advantages of the present invention should now be apparent. An approximate 75 percent reduction in the number of diodes used over a typical prior art circuit is achieved, allowing a 50 percent decrease in control pulse current. Thus, power consumption is significantly reduced. Switching time has similarly been reduced to one nanosecond with no transient output signals, representing a 90 percent increase in switching speed from a typical prior art circuit. Complete capacitive isolation between RF input and output is achieved by the addition of the shunt capacitors across blocking diodes.

It should be understood that the foregoing disclosure relates to only one embodiment of the present invention, and that numerous modifications and variations may be made therein without departing from the spirit and scope of the invention as set forth in the appended claims.

What is claimed is:

1. An electronic switching circuit for selectively transmitting discrete signals comprising:
   - first and second transformers each having a primary coil adapted to receive respective first and second A.C. signals, and a secondary coil for producing an output signal;
   - third and fourth transformers each having a primary coil and a secondary coil for producing an output signal, said third and fourth transformer secondary coils being connected to a common output terminal;
   - first and second pairs of diodes, each of said first pair of diodes being biased in one direction and connected at their cathodes to respective ends of said first transformer secondary coil and at their anodes to respective ends of said third transformer primary coil, and each of said second pair of diodes being biased in the opposite direction and connected at their anodes to respective ends of said second transformer secondary coil and at their cathodes to respective ends of said fourth transformer primary coil; and control input terminal means connected in common to each of said first and second transformer secondary coils intermediate the ends thereof, and adapted to receive a control pulse of either polarity for biasing said first and second pairs of diodes to selectively pass the first and second transformer output signals respectively.

2. An electronic switching circuit as set forth in claim 1, further comprising:

first isolation means connected at respective one ends thereof to the cathodes of each of said first pair of diodes, and at the respective other ends thereof to the anodes of said first pair of diodes for achieving signal isolation between said first and third transformers; and second isolation means connected at respective one ends thereof to the cathodes of each of said second pair of diodes, and at the respective other ends thereof to the anodes of said second pair of diodes for achieving signal isolation between said second and fourth transformers.

3. An electronic switching circuit as set forth in claim 2, further comprising:

said first isolation means including a first pair of capacitors each connected at one end to the respective cathodes of one of said first pair of diodes and at the other end to the respective anodes of the other of said first pair of diodes; and said second isolation means including a second pair of capacitors each connected at one end to the respective anodes of one of said second pair of diodes and at the other end to the respective cathodes of the other of said second pair of diodes.

4. An electronic switching circuit as set forth in claim 3 wherein:

the A.C. signals are RF signals.

* * * * *